CLARK & DELENT.
Sheep Shearer.
No. 69,541.
Patented Oct. 8, 1867.
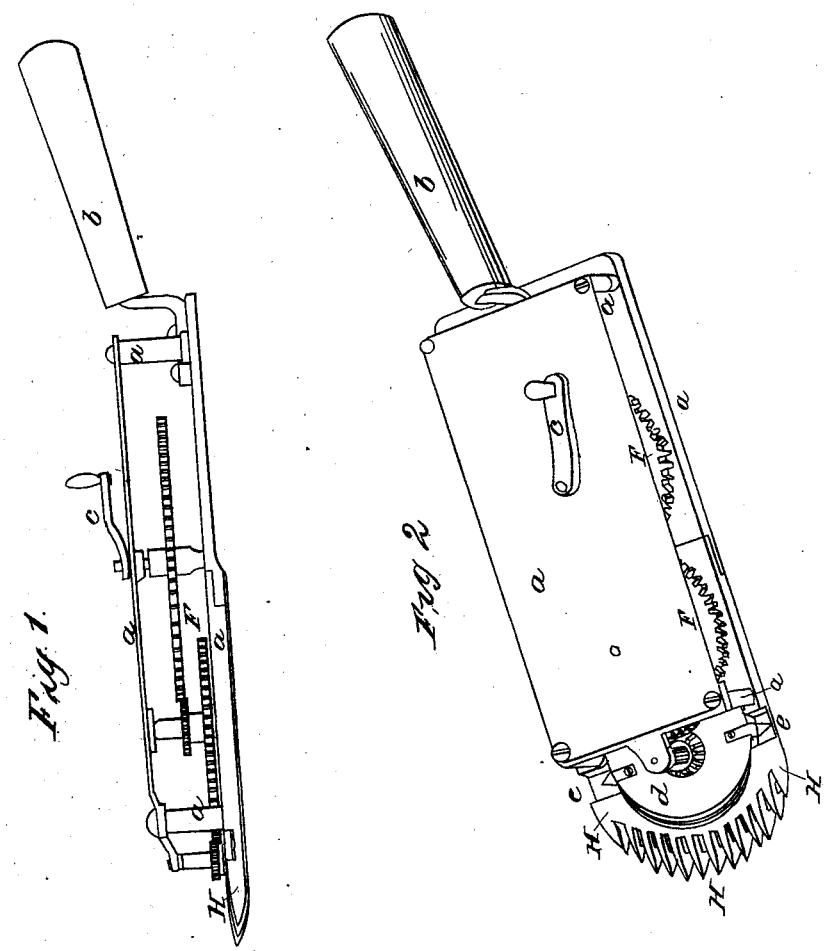

United States Patent Office.

CHARLES P. CLARK AND LEWIS DELENT, OF BEAVER DAM, WISCONSIN.

Letters Patent No. 69,541, dated October 8, 1867.

IMPROVEMENT IN MACHINE FOR SHEARING SHEEP.

The Schedule referred to in these Letters Patent and making part of the same.

TO ALL WHOM IT MAY CONCERN:

Be it known that we, CHARLES P. CLARK and LEWIS DELENT, of the city of Beaver Dam, in the county of Dodge, and State of Wisconsin, have invented a new and useful Machine for Shearing Sheep; and we do hereby declare that the following is a full, clear, and exact description of the construction and operation of the same, reference being had to the annexed drawings, making a part of this specification.

Figure 1 is a longitudinal elevation,

Figure 2 a perspective view.

$a\ a\ a\ a$ represent the different parts of the framework; $b\ b$, the handle by which the machine is guided; $c$, a crank to which the power is attached; $d$, a heavy wheel or truck, which serves as a balance, and to which the knives $e\ e$ are fastened; F, the gearing; H represents the guards.

To enable others skilled in the art to make and use our invention, we will proceed to describe its construction and operation.

In the construction of this machine we use iron, brass, steel, or other material. The frame, as shown in the drawings, is two plates, held and supported by posts, so as to contain the movement or gearing by which the knives are driven, the front end of the lower plate extending out from the upper plate, and forming a comb or series of guards, through which the knives revolve, and which penetrate the wool in advance, and to hold the wool in tension, so that the knives, when in motion, will more readily clip the wool.

The guards H may be a part of the lower plate, or attached each separately to it. The knives $e\ e$ are fastened to the wheel or truck $d$, which truck is of sufficient weight to run steadily.

What we claim as our invention, and wish to secure by Letters Patent, is—

1. The revolving knives $e\ e$, substantially as set forth.

2. The comb or series of guards H, substantially as herein described and for the purposes set forth.

3. The revolving knives $e\ e$, the guards H, in combination with the wheel $d$, the frame $a\ a$, and the gearing F, substantially as and for the purposes described.

CHARLES P. CLARK,
LEWIS DELENT.

Witnesses:
 CHAS. W. RUSSELL,
 LORENZO D. LIVERMORE.